United States Patent
McArdle et al.

(10) Patent No.: US 6,365,212 B1
(45) Date of Patent: Apr. 2, 2002

(54) METHOD OF MAKING A FLAVEDO POWDER FOR ENHANCEMENT OF ORANGE JUICE AND PRODUCT THEREOF

(75) Inventors: Richard N. McArdle, Bradenton; Stephen A. Letourneau, Holmes Beach, both of FL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

(21) Appl. No.: 09/541,870

(22) Filed: Apr. 3, 2000

(51) Int. Cl.[7] .............................................. A23L 1/272
(52) U.S. Cl. ...................... 426/262; 426/479; 426/482; 426/483; 426/599; 426/615; 426/616
(58) Field of Search ................................ 426/262, 616, 426/479, 482, 483, 599, 615

(56) References Cited

U.S. PATENT DOCUMENTS

| | | | |
|---|---|---|---|
| 1,848,760 A | | 3/1932 | Willison |
| 2,556,579 A | * | 6/1951 | Forkner ..................... 426/616 |
| 2,578,915 A | * | 12/1951 | Bartels ....................... 426/616 |
| 3,404,990 A | | 10/1968 | Villadsen et al. |
| 3,557,085 A | | 1/1971 | Glendora |
| 3,558,598 A | | 1/1971 | Epperson et al. |
| 4,248,142 A | | 2/1981 | McKiney, Jr. |
| 4,257,320 A | | 3/1981 | Holbrook et al. |
| 4,470,344 A | | 9/1984 | Bushman |
| 4,581,241 A | * | 4/1986 | DiCicca et al. ............. 426/616 |
| 4,608,266 A | | 8/1986 | Epperson et al. |
| 4,647,466 A | | 3/1987 | Japikse et al. |
| 4,876,102 A | | 10/1989 | Feeney et al. |
| 5,073,397 A | | 12/1991 | Tarr et al. |
| 5,108,774 A | | 4/1992 | Mills et al. |

* cited by examiner

*Primary Examiner*—Helen Pratt
(74) *Attorney, Agent, or Firm*—Cook, Alex, McFarron, Manzo, Cummings & Mehler, Ltd.

(57) ABSTRACT

Disclosed are improved orange juice products and processes of preparing the products. Included is a natural enhancement powder which originates from the flavedo of citrus peel such as orange peel or tangerine peel. The peel flavedo is dried and reduced in particle size and added as a powder to the orange juice in order to enhance the juice, such as raise the Color Value of the orange juice, typically by at least 1 OJ Index unit or more. By this approach, an orange juice which is Grade B in color is changed into an orange juice which meets Grade A color criteria. Other juice enhancements also are realized.

43 Claims, 1 Drawing Sheet

METHOD OF MAKING A FLAVEDO POWDER FOR ENHANCEMENT OF ORANGE JUICE AND PRODUCT THEREOF

BACKGROUND OF THE INVENTION

1. Field of the Invention

The present invention relates to flavedo powder enhancement of citrus juice. The flavedo powder originates from a natural source and provides a non-artifical means to enhance or the nutritional or color aspects of, or provides a natural vehicle for flavoring additions to, citrus juice products. When the invention is utilized for color enhancement of not-from-concentrate orange juice, such is achieved without any substantial negative impact on flavor or other important attributes of the juice. Color enhancement of not-from-concentrate orange juice is especially advantageous for juice which is put up early in the harvest season or during times which high color orange supplies are not available to the extent needed for the commercial not-from-concentrate orange juice industry. At times herein, the color enhancing aspects are specifically referred to. It will be understood that same can apply as well to other attributes of the flavedo powder when blended into citrus juices.

2. Description of Related Art

It is generally recognized that the color of orange juice is a quality which has value to the consumer. This value has been acknowledged in connection with governmental grading of orange juice. As an example, the United States Department of Agriculture (USDA) has designated different grades of pasteurized orange juice, which can be measured by comparing orange juice color with multiple polymeric standard color tubes. By this comparison approach, one can discern orange juice color in accordance with a USDA color grade. This somewhat subjective measurement approach allows one to determine if a juice can be designated as Grade A pasteurized orange juice by exhibiting a USDA color grade of 36–40, or as a Grade B pasteurized orange juice by exhibiting a USDA color grade of 32–35.

More objective color measurement approaches also are available and practiced. A calorimeter can be used to ascertain three primary parameters of an orange juice sample. These parameters, typically X(amber), Y(green) and Z(blue), then are used to calculate a Color Number which is readily convertible into a USDA color score. For example, an orange juice sample having a Color Number of between 35.0 and 36.4 is equivalent to a USDA color score of 36, thereby indicating a Grade A orange juice.

Orange juice coloration is closely related to coloration of the originating oranges, more particularly, coloration of the orange solids and liquids which combine to provide the juice product when expressed from the whole fruit. In an overall sense, whole orange fruit constitutes the orange juice originating components within a peel portion.

Orange peel is generally constituted of albedo and flavedo. Albedo is the generally white, spongy portion of the peel which contains substances such as flavonoids, d-limonene, limonin, and pectin. Flavedo is the colored portion of the orange peel which contains carotenoids; these contribute a large percentage of the characteristic orange color of the fruit and peel oil, the latter contributing to aroma notes of the fruit. It will be appreciated that the flavedo, which is an especially strong color contributor to the outward appearance of the whole fruit, need not correlate directly to the juice color, inasmuch as flavedo traditionally is not an intentional component of orange juice itself, being on the outside of the whole fruit and usually not intentionally harvested into the extracted juice.

While flavedo color is not necessarily closely indicative of internal juice color, the orange cultivar type and the growing season stage for that particular cultivar type does strongly control juice color. Generally, as seasonal maturation increases, color increases. Orange juice color also is affected by growing region and weather and climate conditions or changes. For example, juice from orange fruit grown in dry and cool conditions generally has higher color values from that from fruit grown in more humid and hot conditions. Regarding orange cultivar types, in Florida for example, orange juice from the traditionally most often used earlier season varieties such as Hamlin oranges have color values which often do not meet USDA Grade A standards. Furthermore, the earlier in the season for Hamlin oranges, the generally lower the color value. A typical Florida growing season for these early season Hamlin oranges begins in late October to early November, running until approximately January, at which time harvesting of the preferred and more color-intense Valencia oranges begins in a typical growing cycle.

This means that, during the current commercial Florida orange early harvest season, from about late October to January, juice containing only these early season varieties or cultivars often do not meet USDA Grade A standards. Color Numbers of these juices usually are within the Grade B range of 32 to 35. Often, the early season juices are in the middle to lower portion of that range.

In certain instances, it is important to avoid adding components which do not originate from the citrus stream. Examples are juices which are within the not-from-concentrate category. Adding artificial agents or adding components not originating from the citrus juice stream (or other explicitly approved source) is strictly prohibited and contrary to the standards which are instrumental in maintaining the attractive attributes of this category of juice products. With specific reference to orange juice coloration, currently the sole non-orange stream source which is governmentally and industry approved is blending the lower color early season not-from-concentrate juice with up to 10% tangerine juice (which typically has high color) to obtain a Grade A score. Otherwise, held-over higher color juice (such as that from previous-season Florida Valencia oranges) can be blended in during early season so as to have that earlier season not-from-concentrate orange juice fall into the Grade A range.

It will be appreciated that benefits would be realized if it were possible to positively impact citrus juice products in a straightforward manner, such as enhancing color attributes of not-from-concentrate orange juice without having to resort to the above-noted two color enhancement approaches which are the only ones currently available to the commercial producer. Incorporation of tangerine juice raises a flavor issue. Incorporation of held-over, higher color orange juices is limited by availability during the early season; this approach also brings with it increased costs including capital outlays for hold-over systems.

One approach along the lines of color enhancement might be to extract carotenoids from flavedo, assuming this would be an approved alternative for the selected juice product, such as a not-from-concentrate product. In this regard, literature does describe methods for extracting carotenoids from flavedo. Intuitively, such an approach would entail costs not currently borne by this industry. Patents propose processes for the production of orange-peel derived components, without teaching how to effectively use same in juices or how to address stability or flavor impact issues. In Willison U.S. Pat. No. 1,848,760, citrus peel is chopped and washed for use as a coloring agent. In Epperson U.S. Pat. No. 4,608,266, a citrus extender is produced for citrus juices. Flavedo is extracted from citrus peel and passed with water through a homogenizer. By this process, the peel is placed into colloidal suspension with water, an acidifier, and a chelating agent to produce the extender.

With respect to the color enhancing aspect of the invention, heretofore no approach has been presented which can be practiced to add only color and no other modifiers to citrus juice, especially of the not-from-concentrate type. There accordingly is a need for an approach which can be used to naturally and positively impact citrus juices, such as to enhance color, especially during the times of the year when high color fruit is not readily or naturally available, without otherwise detracting from the other important attributes of the juice, including sensory attributes such as taste. Further advantages can result for an approach which also enhances the nutritional aspects and/or the sensory aspects of the juice products.

SUMMARY OF THE INVENTION

In accordance with the present invention, enhancement of orange juice is accomplished without the use of synthetic agents and with the use of natural flavedo. The flavedo is advantageously treated and added to citrus juice such as orange juice, especially of the not-from-concentrate variety, without significantly negatively impacting taste or other attributes of these types of products. The flavedo is shaved, washed and dried, while providing a powdered component which readily combines with the citrus juice and significantly enhances its color and nutritional aspects and, when desired, provides a vehicle for flavor addition.

One object of the present invention is to provide a color-improved citrus juice. To attain this object natural flavedo is harvested from citrus peel and formed into a powdered color-enhancement component, which component is added to the citrus juice in order to substantially increase color scores while avoiding otherwise negatively modifying the citrus juice to any significant extent.

Another object of the present invention is to provide an enhanced not-from-concentrate orange juice which retains all of the advantageous attributes of the orange juice and which continues to incorporate only natural, citrus originating components.

Another object of this invention is to provide an improved method and juice product which allows for deep orange colored orange juice throughout the calendar year, whether it be after or before the growing season for the more deeply colored orange fruit varieties.

Another object of the present invention is to provide an improved method and juice product which avoids disadvantages to the use of extracted orange peel pigments in orange juice, which tend to have associated flavedo components that negatively affect the flavor of the orange juice and to not stay evenly distributed in the orange juice due to their hydrophobic nature.

Another object of this invention is to provide an improved juice product and method which allow for nutritional enhancement by the incorporation of additional important flavedo components within the juice.

Another object of the present invention is to provide an improved method and product by which flavoring components are added to citrus juices through the mechanism of incorporation with and/or within natural flavedo material.

Another object of the invention is to provide an improved method and product which improves the sensory character of citrus juice products.

Other objects and advantages of the present invention will be understood from the following description according to preferred embodiments of the present invention, relevant information concerning which is shown in the accompanying drawings.

DESCRIPTION OF THE PREFERRED EMBODIMENTS

Figure 1:
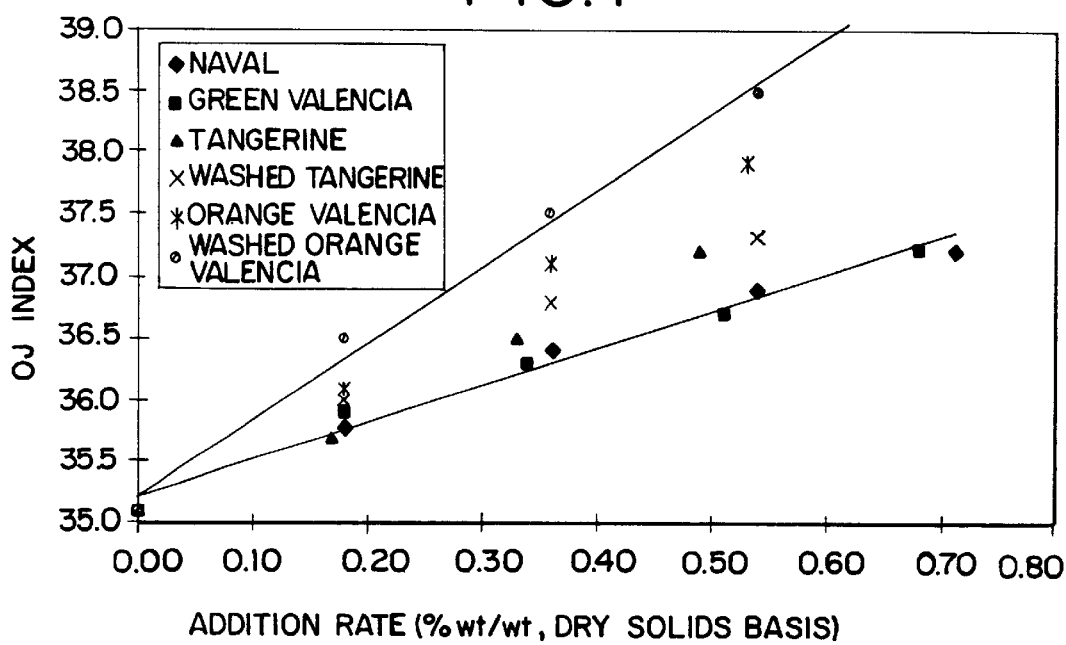
FIG. 1 is a plot of OJ Index versus the weight percent of addition to not-from-concentrate orange juice of various flavedo powders, illustrating differing responses in terms of ability to increase OJ Index.

An enhanced citrus juice is provided by addition of a powder to the juice. Preferably, the addition is to a full strength juice, most preferable to a not-from-concentrate citrus juice. Typically, the juice will be an orange juice, and the powder added will originate from flavedo of orange fruit or tangerine fruit.

The powder according to the invention exhibits a particulate size which facilitates combining same with the citrus juice while also maintaining the powder suspended within the citrus juice to the extent needed for a commercial full strength citrus juice. A typical powder in line with the invention has particles of a size not greater than about 150 microns. It is understood that the particle size is an approximate diameter size, keeping in mind that the particles are not necessarily truly spherical. Preferably, the particle size will be between about 50 and about 150 microns, most preferably between about 75 and about 100 microns.

Furthermore, the powder has a relatively low moisture content such that it is characterized by being a dry, free-flowing powder. Typically, the powder has a selected moisture content which is not greater than about 20 weight percent moisture, based on the total weight of the juice-enhancement powder. Preferably, the powder has a moisture content of between about 5 and about 15 weight percent moisture, based on the total weight of the powder, more preferably not greater than about 12 weight percent moisture, such as between about 5 and about 12 weight percent. This dryness assures that the juice-enhancement powder is free-flowing, non-clumping, and facilitative of incorporation into the citrus juice.

With regard to the levels at which the enhancement powder can be properly added to the citrus juice, typically at least about 0.1 weight percent of the powder being added, based upon the total weight of the citrus juice product. Usually, not more than about 1.0 weight percent of the powder will be incorporated into the juice. Preferably, the enhancement attributes of the powder in terms of color enhancement will be such that adding not more than about 0.25 weight percent will increase the Color Value of the supply of orange juice by at least 1 OJ Index unit. These enhancement attributes also will be such that adding about 0.5 weight percent of the powder to the juice, based on the total weight of the juice, will enhance the Color Value of the citrus juice by at least 2 OJ Index units. It is generally preferred to add the powder at between about 0.2 and about 0.8 weight percent of the resulting citrus juice product, although higher levels could be beneficial for juice-enhancement properties other than color.

It will be appreciated that an especially advantageous use of the enhancement powder is one which includes adding same to a Grade B color single-strength orange juice at a level such that this juice supply qualifies as a Grade A color orange juice. Depending upon the initial Color Number of the orange juice, this approach will raise the OJ Index of the color enhanced orange juice by, for example, from 1 to 3 Color Numbers. When needed, the invention can be useful in raising the OJ Index to above 3 Color Numbers, such as at as high as about 5 Color Numbers.

This color-enhancing effect is in addition to the nutritional-enhancement benefits attained by incorporating the natural flavedo additive into the juice. Generally speaking, as increased levels of flavedo powder are added, the levels of nutritional components added to the juice are increased to a corresponding extent. Flavonoids are added. Examples of nutritional enhancement which has been found to be achieved by the invention include increased beta-carotene and retinol (Vitamin A) inclusion, and increased hesperidin inclusion. Vitamin A inclusion typically is within a range of about 0.5 to about 1.5 mg of Vitamin A per 100 grams of the juice enhancement powder. Hesperidin inclusion typically is within a range of about 500 to about 900 mg of hesperidin per 100 grams of the juice enhancement powder.

Referring particularly to the method of providing the juice-enhancement powder, such begins by selecting a supply of citrus fruit. When color enhancement is to be effected by the powder, the selected fruit should have a high level of pigmentation and/or carotenoid content, thereby maximizing the color enhancement efficiency of a given quantity of the powder. By virtue of certain nutritional components present in flavedo, including important citrus phytochemicals, the flavedo-originating powder provides valuable nutritional features to the flavedo powder. Flavedo powder according to the invention contains nutritional enhancements such as vitamins, beta-carotene, and the like.

Suitable selected fruit originating materials include *Citrus sinensis* varieties such as Valencia orange and *Citrus reticulate* varieties such as mandarin orange and tangerine. Less desirable are so-called re-greened orange fruit, even of the Valencia variety. Also generally acceptable but not as preferred as full color Valencia are varieties such as navel oranges. Generally, the variety or cultivar which is selected should be more intense in color than the juice to be color enhanced when color enhancement is an objective.

Next, the selected supply of citrus fruit is subjected to handling so as to remove natural flavedo from the peel portion of the fruit. Preferably, this is accomplished by a shaving procedure, preferably a procedure which is generally in accordance with so-called zesting which removes the outermost layer of the peel. It is especially advantageous if the zesting or shaving removes not more than about 1 mm of the outside of the citrus peel. Generally, it is disadvantageous to include substantial quantities of albedo in the shaved peel. The result is to provide a quantity of natural flavedo shavings.

It is preferred to thereafter wash the quantity of natural flavedo shavings with a wash composition. Washing can include mixing of flavedo particles on the order of 5 mm for about 10 minutes, for example, in order to have the wash composition contact a substantially great surface area. The quantity of wash composition used will depend somewhat upon the make-up of the wash composition. A typical ratio of wash composition to flavedo is between about 0.5:1 and about 5:1, preferably between about 1:1 and about 3:1. It is especially desirable if the wash composition be an alcoholic composition, such as one whose principal washing component is a C-1 to C-4 alcohol, or blends of such alcohols. Examples of alcohols in this regard are ethanol, isopropanol, methanol and butanol. Also useful for washing are other solvents commonly used and permitted in food processing, such as ethyl acetate, acetone, hexane and/or benzene. Multiple washing with the liquid wash composition or compositions can be performed.

This washing is believed to solubilize unwanted components, such as hydrophobic oil components. Such components thus are removed from the flavedo particles in order to enhance the particles, such as by bitterness reduction, for example. Using a solvent containing wash composition, especially one including an alcoholic solvent, can be particularly beneficial in this regard.

After washing, the shavings are separated from the wash composition and recovered as washed shavings. Such washed shavings are dried and reduced in particle size, if not previously reduced in size as desired in accordance with the invention. The drying and/or particle size reduction provide a washed juice enhancement powder having the particle sizes and moisture contents as discussed elsewhere herein. This drying procedure typically includes heating of the washed shavings, particles or reduced-size particles until the desired moisture level is attained. Heated air drying is particularly preferred. This heating is believed to volatilize off some of the undesirable flavor components present in a typical flavedo source.

Especially useful when the drying is carried out after size reduction is to have the size reduction include a two-stage approach. When thus practiced, the first stage grinds the flavedo to about 0.03 to 0.2 mm (300 to 2000 microns). The thus initially size reduced flavedo is then subjected to a second stage size reduction, which can be homogenization, to the desired particle size. If desired, this homogenization can be in the presence of a supply of the citrus juice to be enhanced. With this approach, the size reduction is at least partially in liquid form. This size reduced flavedo then is subjected to drying as noted herein.

Alternatively, the procedure of reducing the particle size is initiated, or at least completed, after the drying of washed shavings is substantially completed. In this way, the particle size reduction is especially efficient inasmuch as the dried flavedo shavings will be more easily size reduced without interference from excess moisture.

Whatever approaches are used in forming the powder juice enhancer, this dry free-flowing powder is believed to have advantages over, for example, a liquid color enhancement component. It is observed that the powder is more stable and overall easier to handle than a liquid component. Also, undesirable flavors are more readily removed from a dry powder, due in large measure to their total enhanced dry surface area which is more easily wetted such as during the washing procedure than is possible for when a liquid system is enlisted. In addition, a liquid enhancement system can experience a tendency to separate, leading to possible uneven and/or inconsistent application of enhancement properties.

If not previously incorporated into the citrus juice, the enhancement powder is combined with a supply of citrus juice to thereby provide the enhanced citrus juice, most advantageously not-from-concentrate, single-strength orange juice. In most instances this will be prior to juice homogenization and pasteurization. This combining will be at levels commensurate with the enhancement needed, such as for color enhancement to raise a Grade B juice to a Grade A juice. Addition in this regard is at levels as discussed herein, which will vary depending upon, for example, the color intensity of the particular flavedo powder and the shortfall of the juice from Grade A quality, or other quality desired.

An important aspect of the present invention is its ability to enhance the juice as needed without significantly detrimentally affecting the sensory attributes of the citrus juice, especially its taste attributes. Also, this is accomplished without incorporating any synthetic additives. The sensory attributes of the color enhanced juice substantially comport with those of the originating supply of juice.

Certain enhancement attributes and sensory attributes are illustrated by the following Examples.

EXAMPLE 1

A supply of each of four differently colored citrus fruits were obtained. These were Florida Valencia oranges (*Citrus sinesis*), Florida re-greened Valencia oranges, Florida Murcott frozen tangerine peel waste from a commercial extraction process (*Citrus reticulata*), and California Naval oranges. Peel color was measured with a hand-held colorimeter (Minolta, Model CM-508d). Hunter $L^*$ (lightness), $a^*$ (redness), and $b^*$ (yellowness) values were recorded from 25 fruit or pieces of peel (one measurement per piece). A peel Color Value was determined based on these measurements and is derived from the formula: $(a^*+b^*)/L^*$. Flavedo was removed from washed whole fruit or peel waste (tangerine) by means of a hand-held flavedo zester. Approximately 80% of the flavedo was removed from the fruit in this manner.

Flavedo shavings were either washed with alcohol and then dried or simply dried. Flavedo shavings from Florida Valencia and tangerine peel waste were washed with alcohol. The Florida Valencia flavedo was washed with ethanol. The tangerine flavedo was washed with orange Aroma Fraction (Firmenich, product 5001). This Orange Aroma Fraction is commercially available and is derived from the water phase essence collected during the orange juice concentration process of *Citrus Sinesis* and is 90% ethanol. Flavedo was mixed with alcohol in a ratio of 1:2 (1 part flavedo: 2 parts alcohol by weight). The flavedo/alcohol mixture was mixed with a hand-held mixer (high shear) to reduce the size of the flavedo shavings to approximately 5 mm. Mixing was continued for a total of 10 minutes. After mixing, the flavedo was allowed to settle in the mixture. Alcohol was removed from the flavedo by passing the mixture through Whatman #1 filter paper. The collected alcohol was discarded. The collected flavedo was spread evenly on a metal pan and placed into a vacuum oven at 50° C. and 15 in Hg. Flavedo was dried to approximately 10% moisture. Dried flavedo was then ground in a mill to approximately 0.2 mm size.

Dried, ground flavedo was mixed with single strength, not-from-concentrate orange juice. The flavedo/orange juice mixture was passed through a high pressure homogenizer (Microfluidics Corporation, Model M110-L) at 8,000 psi (single pass, 100μm interaction chamber). Homogenized flavedo/orange juice was then pasteurized at 195° F. using a laboratory scale pasteurizer (Microthermics).

Particle size was measured using a laser scattering particle size analyzer (Horiba Instruments). Hunter $L^*$, $a^*$, and $b^*$ values and OJ Index (Color Number) were measured using a GretagMacbeth calorimeter. OJ Index, or Color Number, was calculated using the X, Y, and Z standard observer parameters with the following formula: $17[(3.4X/Y)-(Z/Y)+(5/Y)]-12.6$. Brix was measured by refractive index. Recoverable oil was measured by the Scott Oil Method. Acidity was measured by titration with sodium hydroxide. Viscosity was measured using a UL adapter at 60 RPM on a Brookfield viscometer (model DV-11+). Moisture of flavedo powders was measured by drying to constant weight at 70° C. and 20 inches of mercury.

Average and standard deviation Hunter $L^*$, $a^*$, and $b^*$ values of the starting fruit peel are presented in Table I along with the calculated Color Value. The Florida Valencia was the alcohol-washed peel. Determination of Color Value was done through the equation: $(a^*+b^*/L^*)$, or the sum of measurement of red to green and yellow to blue divided by the lightness of the sample. This equation proved useful in rating the four differently colored fruits.

TABLE I

| Sample | $L^*$ | $a^*$ | $b^*$ | ColorValue $(a^* + b^*)/L^*$ |
|---|---|---|---|---|
| re-greened Valencia | 61.26 ± 4.00 | 8.60 ± 5.11 | 60.04 ± 5.17 | 1.12 |
| Navel | 65.63 ± 1.46 | 23.40 ± 5.62 | 64.10 ± 2.40 | 1.33 |
| Tangerine | 49.08 ± 2.34 | 24.99 ± 2.33 | 46.60 ± 3.77 | 1.46 |
| Florida Valencia | 61.13 ± 2.12 | 31.69 ± 3.30 | 64.98 ± 3.28 | 1.58 |

Addition of flavedo powders, processed from the four differently colored starting materials, to orange juice at various rates resulted in differing responses in terms of ability to increase OJ Index (See FIG. 1). Flavedo powder made from alcohol-washed orange Valencia flavedo demonstrated the highest OJ Index increase with increasing addition rate.

Figure 2:
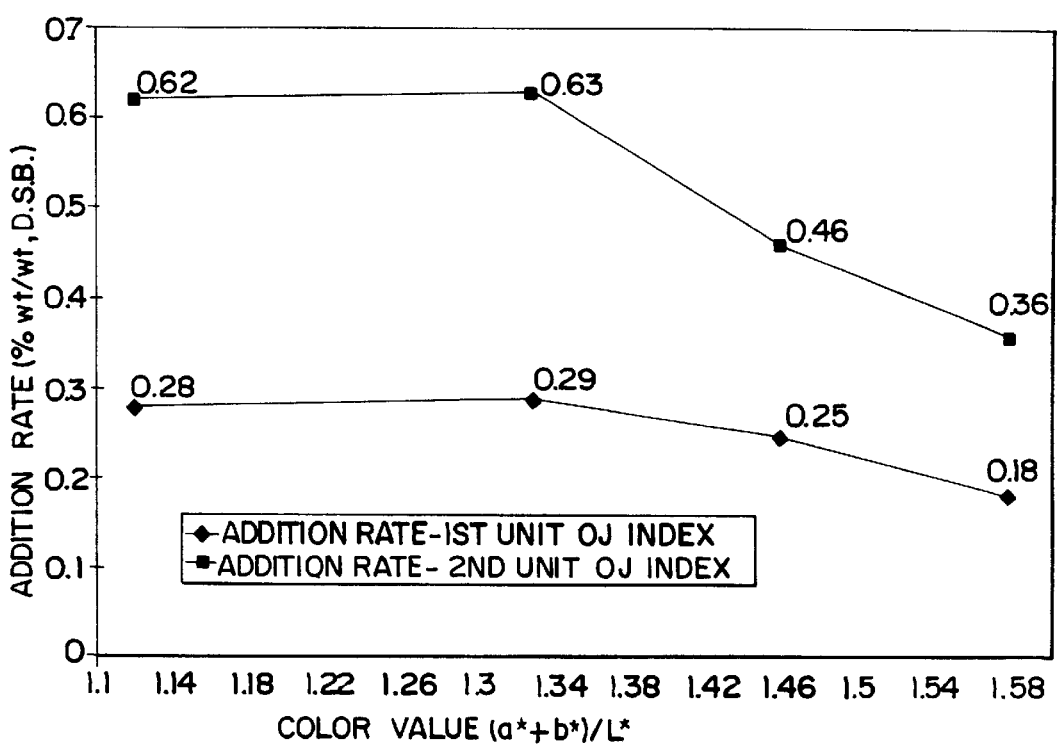
FIG. 2 shows a plot of weight percent addition of a color-enhancing flavedo powder which achieves either a one or a two Unit OJ Index increase, the plot being against Color Value of the starting peel from which the flavedo powder was produced.

Another way of relating initial peel color to efficacy of flavedo powder to increase OJ Index is presented in FIG. 2. As the Color Value of the starting peel increases, a lower amount of flavedo powder made from that starting material is needed to attain a 1 unit OJ Index increase. For example, the addition rate needed to attain a 1 unit OJ Index increase with a flavedo powder made from a starting material with a Color Value of 1.12 was 0.28%. Only 0.18% wt/wt addition was needed to attain a 1 unit OJ Index increase when the flavedo powder was made from a 1.58 Color Value starting material. This same trend was evident to attain the second unit OJ Index increase.

The usefulness of alcohol-washing of flavedo prior to drying was demonstrated by Gas Chromatography and Mass Spectra analyses. These analyses showed that various orange flavor compounds were removed from the tangerine flavedo by the alcohol wash step. The major compound removed was d-limonene but also removed were myrcene, a-pinene, and sabinene.

Physical and chemical measurements of three of these samples are presented in Table II. These samples were subjected to sensory analysis, as reported in Example 2. As is evident from Table II, all samples were similar in terms of normal juice chemistry (Brix, acid, Brix-to-acid ratio, and percent oil).

TABLE II

| Sample | OJ Index | L* | a* | b* | Brix | Acid | Ratio | % Oil | pH | Vis (cps) | Mean Size (micrometer) |
|---|---|---|---|---|---|---|---|---|---|---|---|
| Control - homogenized | 34.6 | 57.47 | −5.94 | 28.06 | 12.0 | 0.61 | 19.6 | 0.021 | 3.95 | 3.2 | 48 |
| Ethanol-washed Flavedo (0.36%) | 37.3 (+2.7) | 56.26 | −3.22 | 33.72 | 12.0 | 0.60 | 19.9 | 0.021 | 3.97 | 3.5 | 68 |
| Non-washed Flavedo (0.36%) | 36.9 (+2.3) | 56.25 | −3.32 | 32.10 | 12.1 | 0.61 | 19.9 | 0.020 | 3.95 | 3.6 | 62 |

EXAMPLE 2

The washed and non-washed flavedo powders prepared from Florida Valencia fruit were incorporated into orange juice as described in Example 1 and stored at 35° F. for three weeks before sensory analysis. A proprietary oil "flavor addback" system was added to these samples at a rate of 0.07% (v/v). Descriptive sensory analyses were conducted on the three juices listed in Table II, namely the homogenized control, the washed flavedo orange juice, and the non-washed flavedo orange juice.

Trained panelists evaluated orange juice flavor, based upon a battery of flavor attributes including total orange (an assessment of fruity aromatics associated specifically with orange juice or orange flavoring, such as flavor notes associated with unprocessed, freshly squeezed orange juice and notes associated with processed or heated orange juice or juice components; flavor notes of other citrus and/or other fruit; various other flavor notes which can be present in citrus juice, both positive and negative notes with reference to freshly squeezed juice; basic taste components such as sweet, sour, bitter; chemical interactions of the product with the mouth; and viscosity.

The results of descriptive sensory analysis indicated that no significant differences were detected by the panelists for any of the orange flavor attributes. Significant differences were detected by the panel for the microbiological, sweet, and bitter attributes. Addition of non-washed flavedo powder to orange juice at the 0.36% rate does appear to increase perceived bitterness (1.1 for the control versus 1.5 for the juice having non-washed flavedo powder). However, alcohol-washing of the flavedo does seem to diminish that addition of bitterness (1.3 for the juice having alcohol-washed flavedo powder, versus 1.5). While the non-washed and washed flavedo-added orange juice samples were not significantly different from each other in bitterness, the washed flavedo-added orange juice sample likewise was not significantly different from the homogenized control sample (1.3 versus 1.1).

No significant differences were detected by the panel in the other flavor attributes which are described above.

Control, washed-flavedo, and non-washed flavedo samples were measured for Hunter L*, a*, and b* values and OJ Index through seven weeks. Results are found in TABLE III. Only minimal changes in these color parameters were observed through seven weeks of storage.

TABLE III

| | Control | | | | Washed Flavedo | | | | Non-Washed Flavedo | | | |
|---|---|---|---|---|---|---|---|---|---|---|---|---|
| Age (wks) | OJ Index | L* | a* | b* | OJ Indx | L* | a* | b* | OJ Index | L* | a* | b* |
| 0 | 34.8 | 56.0 | −5.88 | 27.60 | 37.3 | 55.6 | −3.27 | 33.32 | 36.9 | 55.4 | −3.53 | 31.71 |
| 3 | 34.6 | 57.5 | −5.94 | 28.06 | 37.3 | 56.3 | −3.22 | 33.72 | 36.9 | 56.3 | −3.32 | 32.10 |
| 4 | 34.6 | 58.5 | −6.06 | 29.04 | 37.3 | 57.2 | −3.30 | 34.93 | 37.0 | 57.3 | −3.55 | 33.66 |
| 5 | 35.1 | 57.7 | −5.30 | 29.25 | 37.1 | 56.7 | −3.40 | 33.47 | 37.0 | 56.5 | −3.33 | 32.79 |
| 6 | 35.0 | 57.6 | −5.86 | 29.87 | 37.9 | 56.3 | −3.19 | 36.61 | 37.5 | 56.3 | −3.30 | 34.65 |
| 7 | 34.8 | 58.0 | −5.76 | 29.16 | 37.4 | 57.2 | −3.09 | 34.84 | 37.1 | 56.7 | −3.25 | 33.16 |

The data of Examples 1 and 2 demonstrate the efficacy of the invention with respect to color enhancement. They demonstrate the effect of initial peel color on OJ Index increase. Flavedo powder prepared from a high color peel can be added to single strength orange juice at a lower rate, as compared to a flavedo powder prepared from a low color peel, in order to obtain 1-unit and 2-unit increases in OJ Index. Adding flavedo powder at a lower rate is advantageous in terms of minimizing potential flavor impact to the final flavedo-added orange juice.

Washing of flavedo shavings as discussed herein prior to drying enhances the ability of the resulting flavedo powder to increase OJ Index at any given addition rate over the non-washed flavedo powder. The removal of various orange flavor compounds from the flavedo shavings by the alcohol-wash step used in this process was also clearly demonstrated. Sensory analysis of alcohol-washed and non-washed flavedo-added orange juice demonstrated the usefulness of alcohol-washing in minimizing the perception of bitterness in the final flavedo-added juice.

Size reduction of the dry flavedo powder as it is incorporated into orange juice is important for the visual quality of the final product. The absence of visually apparent flavedo particulates in the juice prepared in this manner provides for a high quality product. Size reduction is also important for the sensory mouth feel quality of the juice as it reduces the perception of particulates being present or "chalkiness" in the mouth.

In addition, the evaluation of color of the orange juice indicated that the orange juice prepared according to the invention provided for a final orange juice which had stable color values through seven weeks of storage.

The flavedo powder also adds to the juice into which it is incorporated desirable nutritional characteristics. For example, the flavedo powder contains Vitamin A (beta-carotene and retinol) at a level of approximately 0.98 mg per 100 grams, while freshly extracted orange juice typically contains 0.12 mg beta carotene per 100 grams. Vitamin A is positively associated with human health, including positive effects with respect to vision, growth, reproduction, and the immune system. The flavedo powder also contains hesperidin at approximately 700 mg per 100 grams. Freshly extracted orange juice typically contains flavonoids at 100 mg per 100 grams. Flavonoids such as hesperidin are believed to be linked to the reduction of blood serum cholesterol.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A method for the enhancement of orange juice, comprising:
   selecting a supply of citrus fruit;
   shaving natural flavedo from the supply of citrus fruit to provide a quantity of natural flavedo shavings;
   washing the quantity of natural flavedo shavings with a wash composition having a principal washing component which is a C-1 to C-4 alcohol or a blend of such alcohols;
   separating, after said washing, said natural flavedo shavings from said wash composition to thereby provide washed shavings;
   drying said washed shavings to a selected moisture content and reducing the washed shavings to a particle size of not greater than about 150 microns to thereby provide a washed juice enhancement powder; and
   combining said washed juice enhancement powder with a supply of orange juice in order to thereby provide an orange juice which is enhanced in at least its orange color intensity.

2. The juice enhancement method according to claim 1, wherein the selected moisture content of the drying procedure is not greater than about 20 weight percent moisture, based on the weight of the washed shavings after same are thus dried.

3. The juice enhancement method according to claim 1, wherein the selected moisture content of the drying procedure is not greater than about 12 weight percent moisture, based on the weight of the washed shavings after same are thus dried.

4. The juice enhancement method according to claim 1, wherein the selected moisture content of the drying procedure is between about 5 and about 15 weight percent moisture, based on the weight of the washed shavings after same are thus dried.

5. The juice enhancement method according to claim 1, wherein said selected moisture content of the drying procedure is not greater than about 15 weight percent moisture, based on the total weight of the washed color enhancement powder.

6. The juice enhancement method according to claim 1, wherein said reducing of the particle size procedure is initiated after said drying of the washed shavings is substantially completed.

7. The juice enhancement method according to claim 1, wherein said reducing of the particle size procedure reduces the particle size of the washed color enhancement powder to between about 50 and about 150 microns.

8. The juice enhancement method according to claim 1, wherein said reducing of the particle size procedure reduces the particle size of the washed juice enhancement powder to between about 75 and about 100 microns.

9. The juice enhancement method according to claim 1, wherein said combining procedure combines about 0.25 weight percent or less, based on the total weight of the enhanced orange juice, of said washed juice enhancement powder, while effecting an increase in the Color Value of the supply of orange juice, said Color Value increase being at least 1 OJ Index unit.

10. The juice enhancement method according to claim 1, wherein said combining procedure combines about 0.5 weight percent or less, based on the total weight of the enhanced orange juice, of said washed juice enhancement powder, while effecting an increase in the Color Value of the supply of orange juice, said Color Value increase being at least 2 OJ Index units.

11. The juice enhancement method according to claim 1, wherein said combining procedure combines between about 0.5 and about 0.75 weight percent, based on the total weight of the enhanced orange juice, of said washed juice enhancement powder.

12. The juice enhancement method according to claim 1, wherein the citrus fruit of the selecting procedure is an orange variety or a tangerine variety.

13. The juice enhancement method according to claim 1, wherein said shaving procedure removes an outside layer of the citrus fruit, which layer has a thickness of not more than about 1 mm, to thereby define said natural flavedo shavings.

14. The juice enhancement method according to claim 1, wherein said shaving procedure removes an outside layer of the citrus fruit, which layer excludes albedo in any substantial quantity, to thereby define said natural flavedo shavings.

15. The juice enhancement method according to claim 1, wherein said drying procedure includes heating of said washed shavings until a moisture content of 20 weight percent or less is imparted to said washed juice enhancement powder.

16. The juice enhancement method according to claim 1, wherein said washing component is ethanol.

17. The juice enhancement method according to claim 1, wherein said combining procedure includes homogenizing said juice enhancement powder together with said supply of orange juice.

18. The juice enhancement method according to claim 1, wherein the supply of orange juice is an early season, Grade B color not-from-concentrate orange juice, and said combining procedure raises the OJ Index of the enhanced orange juice by at least 3 Color Numbers.

19. The juice enhancement method according to claim 1, wherein said combining step provides said orange juice with approximately 0.5 to approximately 1.5 mg of Vitamin A per 100 grams of said juice enhancement powder and with approximately 500 to approximately 900 mg of hesperidin per 100 grams of said juice enhancement powder.

20. A method for enhancing orange juice color without substantially negatively impacting flavor of the originating orange juice and without incorporating any synthetic color additives, comprising:
   selecting a supply of citrus fruit;
   shaving natural flavedo from the supply of citrus fruit to provide a quantity of natural flavedo shavings;
   washing the quantity of natural flavedo shavings with a liquid wash composition having a washing component which includes a C-1 to C-4 alcohol or a blend of such alcohols;

separating, after said washing, said natural flavedo shavings from said liquid wash composition to thereby provide washed shavings;

drying said washed shavings to a selected moisture content of not greater than about 20 weight percent, based on the weight of the shavings after such drying;

reducing the washed shavings to a particle size of not greater than about 150 microns to thereby provide a washed color enhancement powder;

combining said washed color enhancement powder with a supply of not-from-concentrate orange juice in order to thereby provide a color-enhanced not-from-concentrate orange juice; and said washed color enhancement powder provides said color-enhanced not-from-concentrate orange juice which has sensory attributes which substantially comport with those of the supply of not-from-concentrate orange juice.

21. The color enhancement method according to claim 20, wherein the selected moisture content of the drying procedure is not greater than about 12 weight percent moisture, based on the weight of the washed shavings after same are thus dried.

22. The color enhancement method according to claim 20, wherein the selected moisture content of the drying procedure is between about 5 and about 15 weight percent moisture, based on the weight of the washed shavings after same are thus dried.

23. The color enhancement method according to claim 20, wherein said selected moisture content of the drying procedure is not greater than about 15 weight percent moisture, based on the total weight of the washed color enhancement powder.

24. The color enhancement method according to claim 20, wherein said reducing of particle size procedure reduces the particle size of the washed color enhancement powder to between about 50 and about 150 microns.

25. The color enhancement method according to claim 20, wherein said reducing of particle size procedure reduces the particle size of the washed color enhancement powder to between about 75 and about 100 microns.

26. The color enhancement method according to claim 20, wherein said combining procedure combines about 0.25 weight percent or less, based on the total weight of the color enhanced orange juice, of said washed color enhancement powder, while effecting an increase in the Color Value of the supply of orange juice, said Color Value increase being at least 1 OJ Index unit.

27. The color enhancement method according to claim 20, wherein said combining procedure combines about 0.5 weight percent or less, based on the total weight of the color enhanced orange juice, of said washed color enhancement powder, while effecting an increase in the Color Value of the supply of orange juice, said Color Value increase being at least 2 OJ Index units.

28. The color enhancement method according to claim 20, wherein said combining procedure combines between about 0.5 and about 0.75 weight percent, based on the total weight of the color enhanced orange juice, of said washed color enhancement powder.

29. The color enhancement method according to claim 20, wherein the citrus fruit of the selecting procedure is an orange variety or a tangerine variety.

30. The color enhancement method according to claim 20, wherein said shaving procedure removes an outside layer of the citrus fruit, which layer has a thickness of not more than about 1 mm, to thereby define said natural flavedo shavings.

31. The color enhancement method according to claim 20, wherein said shaving procedure removes an outside layer of the citrus fruit, which layer excludes albedo in any substantial quantity, to thereby define said natural flavedo shavings.

32. The color enhancement method according to claim 20, wherein said combining procedure includes homogenizing said color enhancement powder together with said supply of orange juice.

33. The color enhancement method according to claim 20, wherein the supply of orange juice is an early season, Grade B color orange juice, and said combining procedure raises the OJ Index of the color enhanced orange juice by at least 3 Color Numbers.

34. A color enhanced orange juice which does not incorporate any synthetic additives and which has sensory attributes which substantially conform to those of the orange juice supply prior to color enhancement, the color enhanced orange juice having been prepared by a process comprising:

selecting a supply of citrus fruit;

shaving natural flavedo from the supply of citrus fruit to provide a quantity of natural flavedo shavings;

washing the quantity of natural flavedo shavings with a liquid wash composition having a principal washing component which is a C-1 to C-4 alcohol or a blend of such alcohols;

separating, after said washing, said natural flavedo shavings from said liquid wash composition to thereby provide washed shavings;

drying said washed shavings to a selected moisture content of not greater than about 20 weight percent, based on the weight of the shavings after such drying;

reducing the washed shavings to a particle size of not greater than about 150 microns to thereby provide a washed color enhancement powder;

combining said washed color enhancement powder with a supply of orange juice in order to thereby provide a color-enhanced orange juice; and said washed color enhancement powder provides said color-enhanced orange juice which has sensory attributes which substantially comport with those of the supply of orange juice.

35. The orange juice according to claim 34, wherein said supply of orange juice of said combining procedure is not-from-concentrate orange juice.

36. The orange juice according to claim 34, wherein said washed color enhancement powder has a particle size of between about 75 and about 100 microns.

37. The orange juice according to claim 34, wherein said combining procedure combines about 0.25 weight percent or less, based on the total weight of the color enhanced orange juice, of said washed color enhancement powder, while effecting an increase in the Color Value of the supply of orange juice, said Color Value increase being at least 1 OJ Index unit.

38. The orange juice according to claim 34, wherein said color-enhanced orange juice has between about 0.5 and about 0.75 weight percent, based on the total weight of the color enhanced orange juice, of said washed color enhancement powder.

39. The orange juice according to claim 34, wherein said supply of orange juice is a Grade B color orange juice, and said color-enhanced orange juice is a Grade A color orange juice.

40. A color-enhanced not-from-concentrate orange juice which does not incorporate any synthetic additives and which has sensory attributes which substantially conform to those of the not-from-concentrate orange juice supply prior to color enhancement, the color enhanced orange juice including:
- a natural flavedo juice enhancement powder originating from a supply of citrus fruit peel flavedo, said powder having been washed with a composition having a principal washing component which is C-1 to C-4 alcohol or blend of such alcohols, said powder being present in the color enhanced not-from-concentrate orange juice at a level of between about 0.5 and about 0.75 weight percent, based on the total weight of the color enhanced orange juice, said powder having a particle size of not greater than about 150 microns;
- a supply of not-from-concentrate orange juice which has a known Color Value; and
- said color-enhanced orange juice has a Color Value of at least about 1 OJ Index unit greater than said known Color Value while having sensory attributes which substantially comport with those of said supply of not-from-concentrate orange juice having the known Color Value.

41. The orange juice according to claim 40, wherein said natural flavedo color enhancement powder has a moisture content of not greater than about 20 weight percent, based on the weight of the powder.

42. The orange juice according to claim 40, wherein said supply of citrus peel flavedo originates from Valencia orange peel or tangerine peel.

43. The orange juice according to claim 40, wherein said supply of citrus peel flavedo provides said orange juice with approximately 0.5 to approximately 1.5 mg of Vitamin A per 100 grams of said juice enhancement powder and with approximately 500 to approximately 900 mg of hesperidin per 100 grams of said juice enhancement powder.

* * * * *